A. W. PATTISON.
STEERING AND CONTROLLING SYSTEM FOR AUTOMOBILES.
APPLICATION FILED OCT. 13, 1913.

1,154,653.

Patented Sept. 28, 1915.
3 SHEETS—SHEET 1.

A. W. PATTISON.
STEERING AND CONTROLLING SYSTEM FOR AUTOMOBILES.
APPLICATION FILED OCT. 13, 1913.

1,154,653.

Patented Sept. 28, 1915.
3 SHEETS—SHEET 2.

Witnesses
Chas. W. Stauffiger
Anna M. Dow.

Inventor
Albert W. Pattison,
By
Attorneys

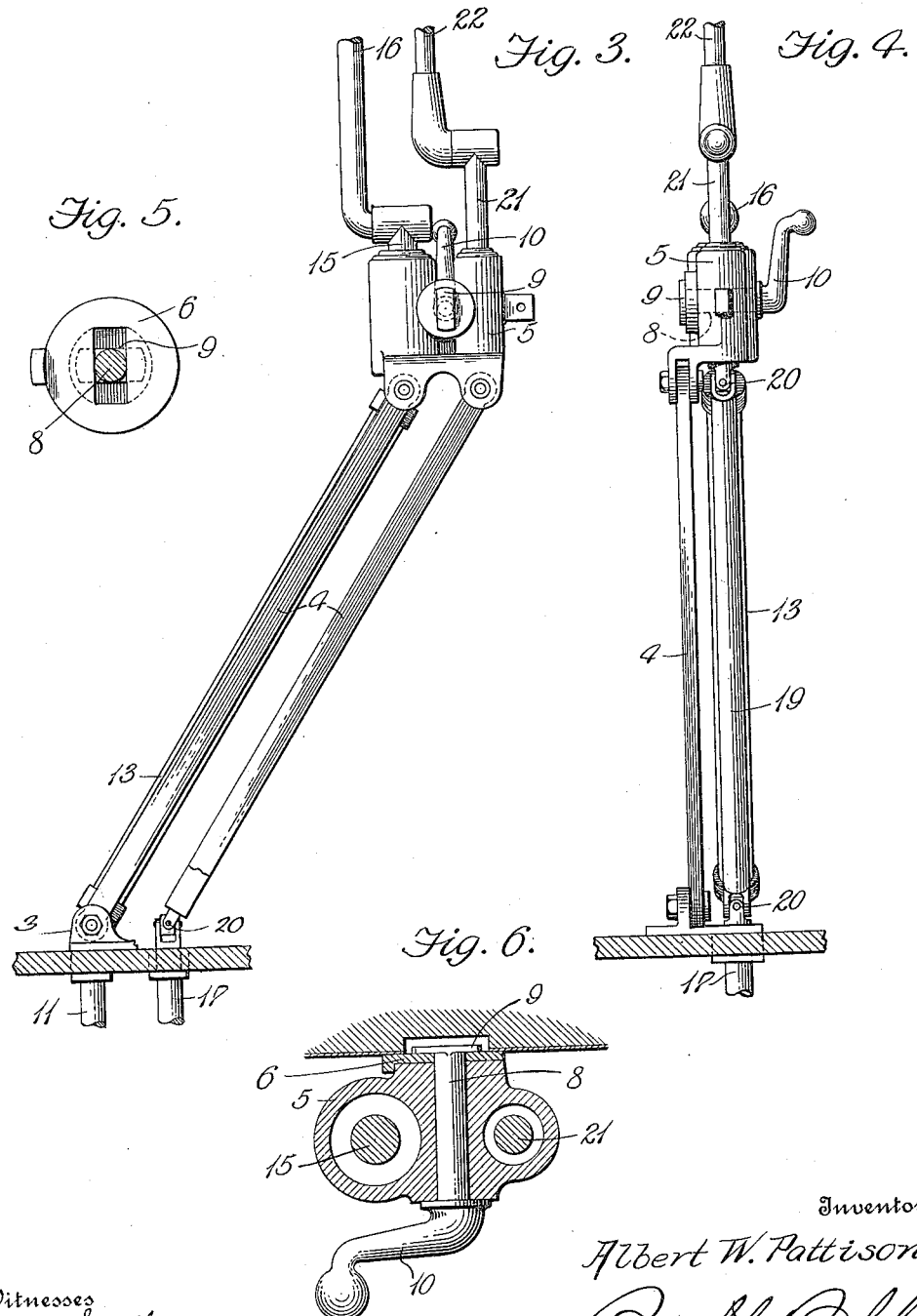

UNITED STATES PATENT OFFICE.

ALBERT W. PATTISON, OF DETROIT, MICHIGAN, ASSIGNOR TO GRINNELL ELECTRIC CAR CO., OF DETROIT, MICHIGAN, A CORPORATION OF MICHIGAN.

STEERING AND CONTROLLING SYSTEM FOR AUTOMOBILES.

1,154,653.  Specification of Letters Patent.  Patented Sept. 28, 1915.

Application filed October 13, 1913. Serial No. 794,822.

*To all whom it may concern:*

Be it known that I, ALBERT W. PATTISON, a citizen of the United States of America, residing at Detroit, in the county of Wayne and State of Michigan, have invented certain new and useful Improvements in Steering and Controlling Systems for Automobiles, of which the following is a specification, reference being had therein to the accompanying drawings.

This invention relates to a controlling and steering mechanism for motor vehicles which may be readily shifted to operate from either the front or rear seat and which can be shifted by the driver without the use of tools or special effort.

The invention consists in the matters hereinafter set forth and more particularly pointed out in the appended claims.

Figure 1:
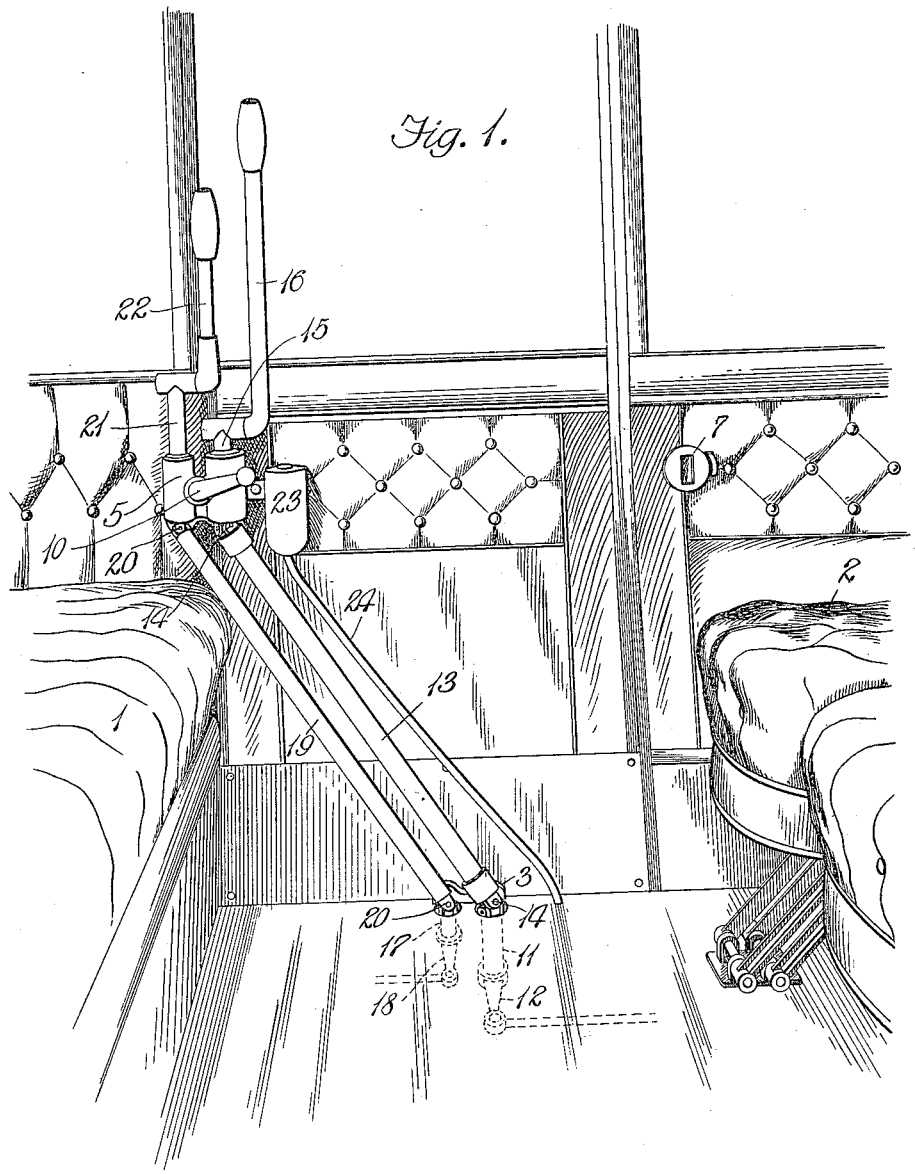
Figure 2:
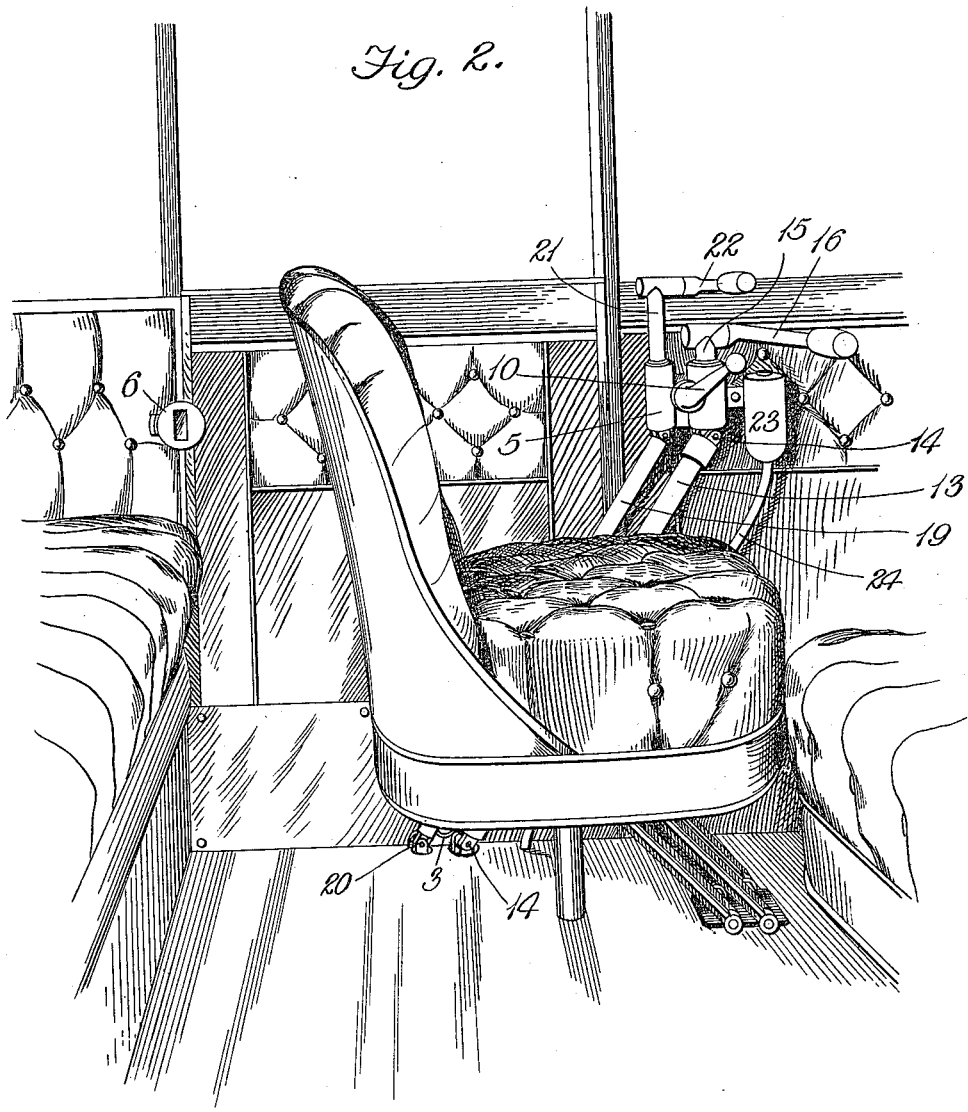

In the drawing, Figure 1 is a view in perspective of the interior of the car provided with a controlling system that embodies features of the invention in rear drive position. Fig. 2 is a view of the interior of the car with the controlling system shifted to the forward drive position; Fig. 3 is a view in rear elevation of the controlling mechanism; Fig. 4 is a view in end elevation of the controlling mechanism; and Figs. 5 and 6 are views in detail of the locking handle and plate.

Referring to the drawings a car body of the inclosed type has a back seat 1 and a forward seat 2, the latter being either shiftable or being permanently secured in the position indicated in Fig. 2. A base plate 3 is mounted on the vehicle floor near the side wall of the car. A pair of parallel links 4 are pivoted to the base plate to swing in an upright plane and are coupled at their top by a fitting 5 in such manner that the latter is maintained in upright position throughout the arc of travel of the links. A locking plate 6 is attached to the side of the car or other convenient support adjacent the rear seat 1 and a front locking plate 7 is similarly supported in operative relation to the front seat 2.

A spindle 8 in the fitting 5 has a tongue 9 on its inner end which may be passed through the slot of either locking plate and moved into engagement therewith by a suitably disposed handle 10.

A steering shaft 11 is journaled in the base plate 3 and is provided with a rock arm 12 adapted to be operatively connected in any suitable manner to the steering knuckles of the car. An intermediate shaft 13 operatively connects the shaft 11 through universal joints 14 with a spindle 15 journaled in the fitting 5 and adapted to be turned by a suitably arranged steering handle 16. The connections of the latter may permit it to be turned upright if desired.

A steering shaft 17 is journaled in the base 3 in parallel relation to the shaft 11 and is coupled to a rock arm 18 and other suitable connections with the motor controlling device of the vehicle. The intermediate shaft 19 with universal joint 20 connects the shaft 17 with a stem 21 that is journaled in the fitting 5 in parallel relation to the shaft 15 and may be turned by a suitable handle 22. The latter may be hinged to turn at upright position if desired.

As a matter of convenience a cut out switch casing 23 may be carried by the fitting 5 with a flexible conductor 24 leading to the motor and forming a part of the circuit thereof. The casing may, of course, have a switch lock, and other appurtenances may be provided if desired.

As a result of this construction a person may control the car from either front or back seat swinging the mechanism forward or back as desired. In either position the construction is rigidly supported so that it is as effective as the fixed type common in such vehicles. It avoids the use of two controlling seats and permits of the disposition of the seats so that the occupants may all face forward or toward the middle of the car. Thus as indicated in Fig. 1 the seats may face each other or as in Fig. 2, the driver's seat may be movably or permanently secured in proper relation to the front drive position.

Obviously, changes in the details of construction may be made without departing from the spirit of my invention and I do not care to limit myself to any particular form or arrangement of parts.

What I claim is:—

1. In a motor vehicle having a front seat and a back seat, controlling and steering means permanently attached to the vehicle and adapted to be swung in a plane longitudinally of the car, and locking means for securing them in either forward or back position, the controlling and steering means being operable from either seat for manipulating the vehicle in either forward or backward direction.

2. In a motor vehicle having a front seat and a back seat, steering and controlling means permanently connected to the vehicle and adapted to be shifted into operative relation to either seat whereby the vehicle may be operated in either direction from either seat, and locking means for securing the controlling and steering means in either position.

3. In a motor vehicle, a front seat and a back seat, locking plates each fixed to the vehicle adjacent a seat, a single controlling and steering mechanism permanently connected to the vehicle and adapted to be shifted into operative relation to either seat, and to afford control of the vehicle in direct or reverse drive from either seat, and a locking member in the mechanism for engaging either locking plate and holding the mechanism in operative relation to the companion seat.

4. In a motor vehicle having a front and rear seat, a single steering and controlling mechanism consisting of a base plate secured to the vehicle intermediate the seats, a fitting, links that are adapted to couple the fitting and base, and to swing in an arc, means for locking the fitting adjacent either seat, and controlling and steering levers carried by the fitting and articulated by flexible connections with controlling and steering shafts.

5. In a motor vehicle having a front seat and a back seat, a base supported on the vehicle intermediate the seats, a pair of parallel links pivoted to the base to swing in an upright plane, a fitting pivotally secured to the upper end of the links, a steering handle, a rock arm, flexible connections extending from the steering handle through the fitting to the rock arm, a controlling handle, a controlling rock arm, flexible connections extending from the handle through the fitting to the controlling rock arm, and means for securing the fitting adjacent either seat.

6. In a motor vehicle, a base, a fitting, links articulating the fitting and base to swing in parallel relation, means for locking the fitting in either one of two positions, and steering and controlling means carried by the fitting and provided with flexible connections for controlling the car from either position of the fitting.

7. In a motor vehicle having a front seat and a rear seat, a base secured intermediate the seats, locking plates each secured to the car above the base and adjacent the seats, a fitting, a locking member in the fitting for engaging either locking plate and securing the fitting thereto, means articulating the fitting and base for maintaining their operative relation, controlling and steering handles operatively mounted in the fitting, and flexible connections extending from the steering and controlling handles for connection with the motor controlling and steering devices of the car.

8. In a motor car, a base, a fitting, a pair of members journaled in parallel relation therein, parallel links articulating the fitting and base and maintaining them in operative relation, intermediate shafts coupling the respective members of the fitting and base through universal joint connections, handles for manually turning the fitting members, and means for locking the fitting in front or back position in the vehicle.

9. In a motor vehicle, a base, a pair of parallel links pivoted to the base, a fitting pivoted to the links, a locking member in the fitting, locking plates each adjacent the seat adapted to be engaged by the locking member, a pair of parallel rotatable members, a pair of parallel rotatable members in the fitting, universal joint and shaft connections between the companion members at the base and fitting for securing them to turn together and handles each adapted to turn a member of the fitting.

10. In a motor vehicle, a base, a pair of parallel links pivoted to the base, a fitting pivoted to the links, a locking member in the fitting, locking plates each adjacent the seat adapted to be engaged by the locking member, a pair of parallel rotatable members at the base, a pair of parallel rotatable members in the fitting, universal joint and shaft connections between the companion members at the base and fitting for securing them to turn together, handles each adapted to turn a member of the fitting, a controlling switch case carried by the fitting, and flexible connections extending from the casing to the motor circuit.

In testimony whereof I affix my signature in presence of two witnesses.

ALBERT W. PATTISON.

Witnesses:
  OTTO H. STANLEY,
  ANNA M. DORR.

Copies of this patent may be obtained for five cents each, by addressing the "Commissioner of Patents, Washington, D. C."